July 2, 1935.　　　　R. F. KOHR　　　　2,006,460
BRAKE SHAFT
Filed Jan. 30, 1931
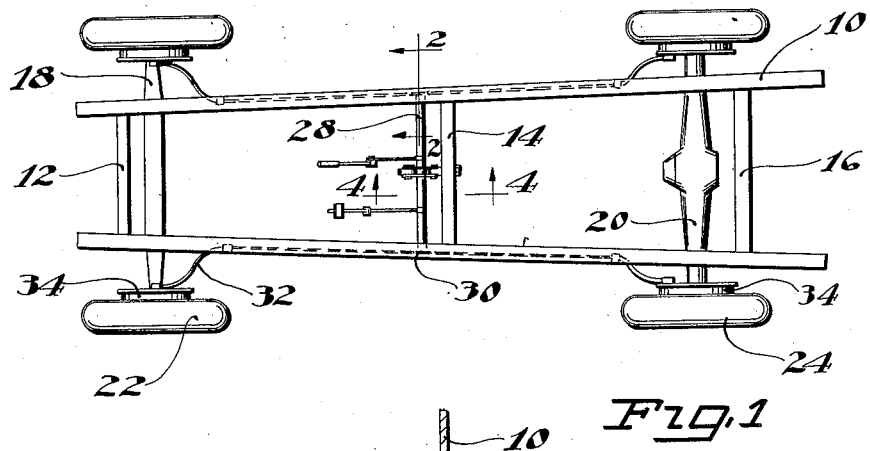
Fig.1
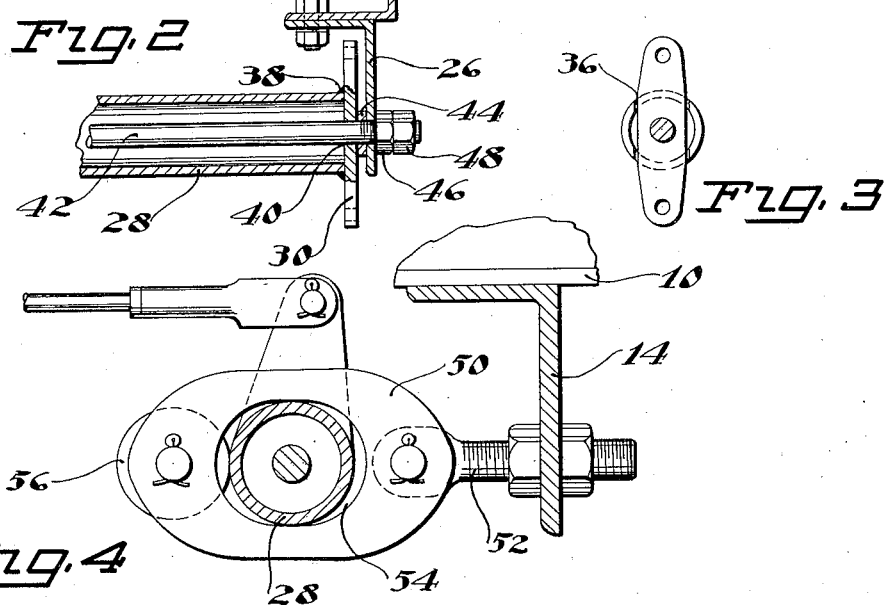
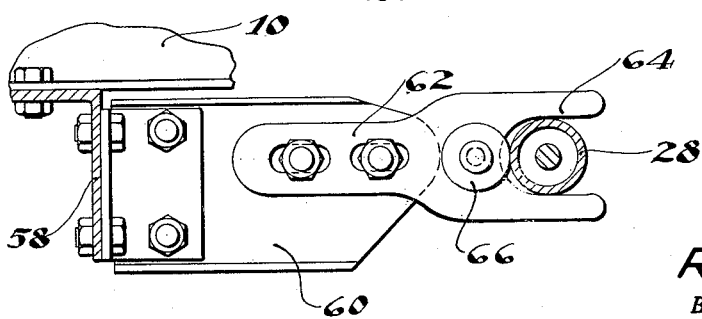
INVENTOR.
ROBERT F. KOHR
BY O. H. Fowler
ATTORNEY Patented July 2, 1935

2,006,460

UNITED STATES PATENT OFFICE 2,006,460

BRAKE SHAFT

Robert F. Kohr, South Bend, Ind., assignor to Bendix Brake Company, South Bend, Ind., a corporation of Illinois Application January 30, 1931, Serial No. 512,319

4 Claims. (Cl. 64—29)

This invention relates to motor vehicles and more particularly to rock shafts therefor.

Broadly, the invention comprehends a hollow shaft having rock arms secured in diametral notches in the respective ends thereof and a rod extending axially through the shaft and through the rock arms providing a reduced bearing radius for the purpose of decreasing friction, together with an adjustable safety bearing for the shaft arranged to prevent disalignment thereof when force is applied to rock the shaft.

An object of the invention is to provide a substantial connection between a shaft and a rock arm therefor.

Another object of the invention is to provide a small bearing radius for the shaft, so that friction may be materially reduced.

Another object of the invention is to provide a shaft and rock arms therefor arranged to support the shaft for rotation.

A further object of the invention is to provide a rock shaft having an adjustable safety bearing arranged to retain the shaft in alignment.

Other objects of the invention will appear from the following description taken in connection with the drawing, which forms a part of this specification, and in which:

Figure 1 is a top plan view of a chassis illustrating the invention as applied;

Figure 2 is a fragmentary view in section of one end of the rock shaft and frame supporting the shaft.

Figure 3 is an end view of the shaft and rock arm secured thereto;

Figure 4 is an enlarged elevation of the safety bearing; and

Figure 5 is a modification of the safety bearing.

Referring to the drawing for more specific details of the invention, 10 represents the side rails of a motor vehicle chassis connected by cross bars 12, 14 and 16. The frame is supported by suitable springs, not shown, on a front axle 18 and a rear axle 20, and supported for rotation on the axles are the conventional front and rear wheels 22 and 24.

Suitably secured to the side rails 10 are dependent brackets 26 supporting a shaft 28 having secured thereto rock arms 30 connected by suitable conduits and cables 32 to brake structures 34 positioned on the axles 18 and 20 adjacent the wheels 22 and 24.

As shown, the shaft 28 comprises a tubular member having diametral notches 36 in its respective ends in which are positioned the rock arms 30. These arms are fitted snugly in the diametral notches and are spot-welded as indicated at 38 to prevent displacement.

The outer faces of the rock arms are flushed with the extreme ends of the shaft and the rock arms are bored as indicated at 40 to receive a rod 42 extending axially through the shaft 28. The rod provides a reduced bearing for the shaft 28, and the extreme ends of the rod pass through suitable openings in the bracket 26.

As shown, suitable washers 44 are slipped on the rod between the rock arms and the brackets, and threaded on the extreme ends of the rod are nuts 46 and lock nuts 48. The rod 42 provides a reduced bearing radius for the shaft and serves to retain the shaft between the brackets where it is securely locked against axial movement.

Positioned on the cross bar 14 is a safety bearing comprising parallel plates 50 pivotally secured to a bolt 52 adjustably supported on the cross bar. The plates have registering longitudinal slots 54 for the reception of the shaft 28 and positioned between the plates is a roller 56 engaging the circumference of the shaft. By adjusting the bolt 52, the relative position of the roller 56 to the shaft 28 may be readily effected to prevent disalignment of the shaft when force is applied thereto tending to rock the same.

A modification of the safety bearing is illustrated in Figure 5. In this modification, a cross bar 58 has bolted or otherwise secured thereto a bracket 60, and adjustably supported on the bracket is an arm 62 having a bifurcated end 64 for the reception of the shaft 28. As shown, the arm 62 has positioned thereon for rotation a roller 66, the periphery of which overlies the crotch of the bifurcated arm 64 to engage the circumference of the shaft.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A shaft comprising a hollow tubular member having diametrical notches arranged in its respective ends, arms positioned in the notches and a rod positioned axially in the tubular member having its respective ends extending through the arms.

2. A shaft comprising a tubular member having corresponding diametrical notches in its respective ends, arms fitted snugly in the notches and spot-welded to the tubular member and a rod positioned axially in the shaft having its ends extending through the arms.

3. A shaft having rock arms on its respective ends each formed with an opening, and means comprising a rod passing through both of said openings for supporting said arms and said shaft and providing a bearing therefor.

4. A brake operating structure comprising a tubular shaft formed with diametrical notches in each end thereof, a pair of arms each formed with an opening and each positioned in one of said notches, and means extending through both of said openings and through the shaft for securing the arms in the slots and for providing bearings for the arms and the shaft.

ROBERT F. KOHR.